(12) United States Patent
Amano et al.

(10) Patent No.: US 11,028,200 B2
(45) Date of Patent: Jun. 8, 2021

(54) SIDE-CHAIN-OLEFIN-CONTAINING VINYL ALCOHOL POLYMER AND METHOD OF PRODUCING SAME

(71) Applicant: KURARAY CO., LTD., Kurashiki (JP)

(72) Inventors: Yusuke Amano, Kurashiki (JP); Yuki Tachibana, Kurashiki (JP); Yuki Kosaka, Kurashiki (JP); Kazuhiko Maekawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 39 days.

(21) Appl. No.: 16/474,148

(22) PCT Filed: Dec. 26, 2017

(86) PCT No.: PCT/JP2017/046535
§ 371 (c)(1),
(2) Date: Jun. 27, 2019

(87) PCT Pub. No.: WO2018/124014
PCT Pub. Date: Jul. 5, 2018

(65) Prior Publication Data
US 2019/0345279 A1 Nov. 14, 2019

(30) Foreign Application Priority Data
Dec. 28, 2016 (JP) .............................. JP2016-255702

(51) Int. Cl.
*C08F 216/06* (2006.01)
*C08F 8/14* (2006.01)
*C08F 261/04* (2006.01)

(52) U.S. Cl.
CPC ............. *C08F 216/06* (2013.01); *C08F 8/14* (2013.01); *C08F 261/04* (2013.01)

(58) Field of Classification Search
CPC ................................ C08F 216/06; C08F 8/14
See application file for complete search history.

(56) References Cited

U.S. PATENT DOCUMENTS

| | | | |
|---|---|---|---|
| 4,915,974 A | 4/1990 | D'Amelia et al. | |
| 5,115,017 A | 5/1992 | D'Amelia et al. | |
| 5,240,996 A | 8/1993 | D'Amelia et al. | |
| 6,081,312 A | 6/2000 | Aminaka et al. | |
| 6,200,720 B1 | 3/2001 | Tagami | |
| 2009/0111940 A1* | 4/2009 | Kato | C08F 2/20 525/60 |
| 2016/0083490 A1 | 3/2016 | Kumaki et al. | |
| 2019/0274961 A1* | 9/2019 | Zheng | A61K 47/32 |

FOREIGN PATENT DOCUMENTS

| | | |
|---|---|---|
| JP | 2-268660 A | 11/1990 |
| JP | 4-283749 A | 10/1992 |
| JP | 10-152524 A | 6/1998 |
| JP | 10-312166 A | 11/1998 |
| JP | 2001-72720 A | 3/2001 |
| WO | WO 2007/119735 A1 | 10/2007 |
| WO | WO 2014/171502 A1 | 10/2014 |

OTHER PUBLICATIONS

International Search Report dated Mar. 13, 2018 in PCT/JP2017/046535 filed on Dec. 26, 2017.

* cited by examiner

*Primary Examiner* — Jeffrey C Mullis
(74) *Attorney, Agent, or Firm* — Oblon, McClelland, Maier & Neustadt, L.L.P.

(57) ABSTRACT

The present invention relates to a vinyl alcohol-based polymer having an olefin in side chain, comprising a vinyl alcohol unit and a structural unit represented by Formula (I), wherein X represents a divalent saturated hydrocarbon group with 1 to 6 carbon atoms, optionally having a branched structure; Y represents a hydrogen atom or a saturated hydrocarbon group with 1 to 6 carbon atoms, optionally having a branched structure; and Z represents a hydrogen atom or a methyl group. Thus, there is provided a vinyl alcohol-based polymer having an olefin in side chain exhibiting higher water solubility even after thermal treatment, higher storage stability, and higher reactivity to high energy beam, and a method for producing it.

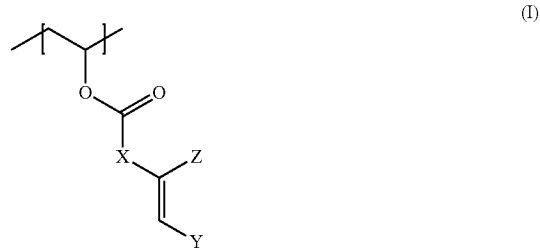

(I)

6 Claims, No Drawings

SIDE-CHAIN-OLEFIN-CONTAINING VINYL ALCOHOL POLYMER AND METHOD OF PRODUCING SAME

TECHNICAL FIELD

The present invention relates to a vinyl alcohol-based polymer having an olefin in side chain and a production method thereof.

BACKGROUND ART

Since vinyl alcohol-based polymers are rare crystalline water-soluble polymers having excellent interface and strength properties, they have been utilized as a stabilizer for paper processing, fiber processing and an emulsion. Meanwhile, attempts have been made for higher functions including improvement in a particular performance by controlling crystallinity and introducing a functional group, and a variety of so-called modified vinyl alcohol-based polymers have been developed.

An olefin, which is a reactive functional group, can be introduced into a side chain of a vinyl alcohol-based polymer to allow for making the polymer water-resistant by high energy beam crosslinking, modifying the polymer by graft polymerization, and so on.

Several types of modified vinyl alcohol-based polymers having an olefin in side chain have been suggested. For instance, Patent Reference No. 1 has illustrated a modified vinyl alcohol-based polymer in which a methacrylate group is introduced into a side chain by using glycidyl methacrylate, and Patent Reference No. 2 has illustrated a modified vinyl alcohol-based polymer in which an acrylamide group is introduced into a side chain by using a methacrylamide compound. Patent Reference No. 3 has also illustrated a modified vinyl alcohol-based polymer in which an acrylate group is introduced into a side chain. However, an $\alpha,\beta$-unsaturated olefin such as an acrylate group, a methacrylate group and an acrylamide group is so reactive that the functional groups can mutually cross-link during storing a modified vinyl alcohol-based polymer, resulting in an insolubilized polymer, which is disadvantageous in terms of storage stability.

Patent Reference No. 4 has illustrated a modified vinyl alcohol-based polymer having an olefin which is not an $\alpha,\beta$-unsaturated type, in side chain, by using 1,4-butanediol divinyl ether or the like. However, a structure introduced into a side chain is hydrophobic, and the polymer tends to gelate in the course of a manufacturing process, which represents a problem in stability. Thus, there has been needed a vinyl alcohol-based polymer which is highly soluble in water, excellent in storage stability and suitably reactive.

PRIOR ART REFERENCES

Patent References

Patent Reference No. 1: JP 1992-283749 A
Patent Reference No. 2: JP 2001-72720 A
Patent Reference No. 3: JP 10-312166 A
Patent Reference No. 4: WO 2014/171502 A1

SUMMARY OF THE INVENTION

Problems to be Solved by the Invention

To solve the above problems, an objective of the present invention is to provide a vinyl alcohol-based polymer having an olefin in side chain which is highly soluble in water even after thermal treatment, excellent in storage stability and highly reactive to a high energy beam, as well as a production method thereof.

After intense investigation for solving the above problems, we have found that a vinyl alcohol-based polymer having an olefin in side chain which is highly soluble in water even after thermal treatment, excellent in storage stability and highly reactive to a high energy beam can be provided by introducing a particular structure having an olefin in a side chain of a vinyl alcohol-based polymer, achieving the present invention. Furthermore, we have found that a substrate can be recycled by peeling off a modified vinyl alcohol-based polymer coating over the substrate.

Means for Solving the Problems

In accordance with the present invention, the above problems can be solved by providing the followings:

[1] A vinyl alcohol-based polymer having an olefin in side chain, comprising a vinyl alcohol unit and a structural unit represented by Formula (I):

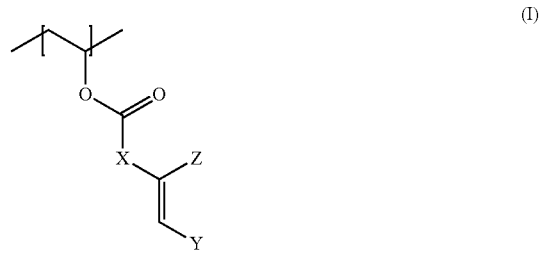

wherein X represents a divalent saturated hydrocarbon group with 1 to 6 carbon atoms, optionally having a branched structure; Y represents a hydrogen atom or a saturated hydrocarbon group with 1 to 6 carbon atoms, optionally having a branched structure; and Z represents a hydrogen atom or a methyl group;

[2] The vinyl alcohol-based polymer having an olefin in side chain according to [1], wherein X is a divalent saturated hydrocarbon group with 1 to 5 carbon atoms, optionally having a branched structure; Y is a hydrogen atom or a saturated hydrocarbon group with 1 to 5 carbon atoms, optionally having a branched structure; and the total carbon number of X and Y is 9 or less;

[3] The vinyl alcohol-based polymer having an olefin in side chain according to [1] or [2], wherein Y is a hydrogen atom;

[4] The vinyl alcohol-based polymer having an olefin in side chain according to any of [1] to [3], wherein a content of the structural unit represented by Formula (I) based on the total monomer units in the vinyl alcohol-based polymer having an olefin in side chain is 0.05 to 10 mol %;

[5] Powder or pellets made of the vinyl alcohol-based polymer having an olefin in side chain according to any of [1] to [4], wherein the polymer has an average particle size of 20 to 1000 μm and 2 g or more of the polymer can be completely dissolved in 100 g of water at 25° C.; and [6] A method for producing the vinyl alcohol-based polymer having an olefin in side chain according to any of [1] to [4], comprising transesterifying a vinyl alcohol-based polymer with an ester compound represented by Formula (II):

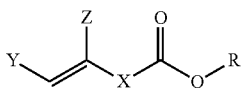

(II)

wherein X, Y and Z are as defined in Formula (I); and R represents a saturated hydrocarbon group with 1 to 5 carbon atoms.

Effects of the Invention

A vinyl alcohol-based polymer having an olefin in side chain according to the present invention is highly water-soluble even after thermal treatment, excellent in storage stability and highly reactive to a high energy beam. It can be, therefore, suitably used for a variety of applications of a polyvinyl alcohol.

MODES FOR CARRYING OUT THE INVENTION

A vinyl alcohol-based polymer having an olefin in side chain of the present invention has a structural unit represented by Formula (I):

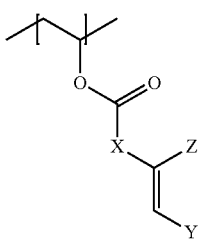

(I)

wherein, X represents a divalent saturated hydrocarbon group with 1 to 6 carbon atoms, optionally having a branched structure; Y represents a hydrogen atom or a saturated hydrocarbon group with 1 to 6 carbon atoms, optionally having a branched structure; and Z represents a hydrogen atom or a methyl group.

Since an olefin present in a repeating unit of a polymer can be crosslinked by a high energy beam, a vinyl alcohol-based polymer having an olefin in side chain of the present invention allows for making the polymer water-resistant and gelation by crosslinking. An olefin in side chain in a vinyl alcohol-based polymer of the present invention, which is not of an α,β-unsaturated type, is so heat-resistant that it can stably exist without being crosslinked during a drying or thermoforming process. Furthermore, an olefin in side chain in a vinyl alcohol-based polymer of the present invention is bound to a main chain of the vinyl alcohol-based polymer via an ester structure, so that the side chain can be decomposed by hydrolysis. Therefore, even after being made water-resistant by crosslinking, it can again become water-soluble by treatment with an alkali or the like and a coated film over the polymer can be removed by decomposition to easily regenerate the substrate. Thus, a vinyl alcohol-based polymer having an olefin in side chain used for regeneration of a substrate is a preferable embodiment of the present invention.

In Formula (I), X represents a divalent saturated hydrocarbon group with 1 to 6 carbon atoms, optionally having a branched structure. In the light of water solubility, X is preferably a divalent saturated hydrocarbon group with 1 to 5 carbon atoms, optionally having a branched structure, more preferably a divalent saturated hydrocarbon group with 1 to 4 carbon atoms, optionally having a branched structure. The divalent saturated hydrocarbon group is preferably at least one selected from the group consisting of alkylene groups and cycloalylene groups. That is, it is preferably at least one selected from the group consisting of alkylene groups and cycloalylene groups with 1 to 6 carbon atoms, optionally having a branched structure, more preferably at least one selected from the group consisting of alkylene groups and cycloalylene groups with 1 to 5 carbon atoms, optionally having a branched structure, further preferably at least one selected from the group consisting of alkylene groups and cycloalylene groups with 1 to 4 carbon atoms, optionally having a branched structure. Examples of an alkylene group include a methylene group, an ethylene group, a propylene group, a butylene group, a pentylene group, and a hexylene group. Among these, at least one alkylene group selected from the group consisting of a methylene group, an ethylene group, a propylene group, a butylene group and a pentylene group is preferably used, and at least one alkylene group selected from the group consisting of a methylene group, an ethylene group, a propylene group and a butylene group is more preferably used. These alkylene groups may have an alkyl group such as a methyl group and an ethyl group as a branched structure. Examples of a cycloalkylene group include a cyclopropylene group, a cyclobutylene group, a cyclopentylene group, and a cyclohexylene group. Among these, at least one cycloalkylene group selected from the group consisting of a cyclobutylene group and a cyclopentylene group is preferably used. These cycloalkylene groups may have an alkyl group such as a methyl group and an ethyl group as a branched structure.

Specific examples of an alkylene group with 1 to 6 carbon atoms, optionally having a branched structure can include a methylene group, an ethylene group, a 1-methylethylene group, a 2-methylethylene group, a 1,1-dimethylethylene group, a 1,2-dimethylethylene group, a 2,2-dimethylethylene group, a 1-ethylethylene group, a 2-ethylethylene group, a propylene group, a 1-methylpropylene group, 2-methylpropylene group, a 3-methylpropylene group, a 1,1-dimethylpropylene group, a 1,2-dimethylpropylene group, a 2,2-dimethylpropylene group, a 1,3-dimethylpropylene group, a butylene group, a 1-methylbutylene group, a 2-methylbutylene group, a 3-methylbutylene group, a 4-methylbutylene group, a 1,1-dimethylbutylene group, a 2,2-dimethylbutylene group, a 3,3-dimethylbutylene group, a 4,4-dimethylbutylene group, a 1,2-dimethylbutylene group, a 1,3-dimethylbutylene group, a 1,4-dimethylbutylene group, a 2,3-dimethylbutylene group, a 2,4-dimethylbutylene group, a 3,4-dimethylbutylene group, a 1-ethylbutylene group, a 2-ethylbutylene group, a 3-ethylbutylene group, a 4-ethylbutylene group, a 1,1-diethylbutylene group, a 2,2-diethylbutylene group, a pentylene group, a 1-methylpentylene group, a 2-methylpentylene group, a 3-methylpentylene group, a 4-methylpentylene group, a 5-methylpentylene group and a hexylene group.

In Formula (I), Y represents a hydrogen atom or a saturated hydrocarbon group with 1 to 6 carbon atoms, optionally having a branched structure. In the light of water solubility and reactivity, Y is preferably a hydrogen atom or a saturated hydrocarbon group with 1 to 5 carbon atoms, optionally having a branched structure, more preferably a hydrogen atom or a saturated hydrocarbon group with 1 to 2 carbon atoms, optionally having a branched structure, further preferably a hydrogen atom. A saturated hydrocarbon group is at least one selected from the group consisting of alkyl groups and cycloalkyl groups. Examples of an alkyl group include a methyl group, an ethyl group, a propyl group, an isopropyl group, a butyl group, an isobutyl group, a sec-butyl group, a tert-butyl group, a pentyl group, an isopentyl group, a neopentyl group, and a hexyl group. Among these, at least one alkyl group selected from the group consisting of a methyl group, an ethyl group, a propyl group, an isopropyl group, a butyl group, an isobutyl group, a sec-butyl group, a tert-butyl group, a pentyl group, an isopentyl group and a neopentyl group is preferably used, and at least one alkyl group selected from the group consisting of a methyl group and an ethyl group is more preferably used. Examples of a cycloalkyl group include a cyclopropyl group, a cyclobutyl group, a cyclopentyl group and a cyclohexyl group. Among these, at least one cycloalkyl group selected from the group consisting of a cyclopropyl group, a cyclobutyl group and a cyclopentyl group is preferably used. In Formula (I), Z represents a hydrogen atom or a methyl group. In the light of water solubility, Z is preferably a hydrogen atom.

In the light of water solubility, the total number of carbon atoms of X and Y is important, and the total number of carbon atoms is preferably 9 or less, more preferably 6 or less, further preferably 5 or less, most preferably 4 or less. If the total number of carbon atoms is more than 9, hydrophobic interaction between side chains in an aqueous solution occurs, leading to viscosity increase or hydrous gelation, which may make molding difficult in a process such as coating.

A content of the structural unit represented by Formula (I) in a vinyl alcohol-based polymer having an olefin in side chain of the present invention is, but not limited to, preferably 0.05 mol % or more, more preferably 0.1 mol % or more, particularly preferably 0.3 mol % or more based on 100 mol % of the total structural units in the polymer. A content of the structural unit represented by Formula (I) is preferably 10 mol % or less, more preferably 7 mol % or less, particularly preferably 5 mol % or less, based on the total structural units in the polymer. When the content is within these preferable ranges, a coating crosslinked by a high energy beam tends to be water-resistant. If the content is less than 0.05 mol %, modification of a vinyl alcohol-based polymer by the structural unit represented by Formula (I) may be insufficiently effective. If the content is more than 10 mol %, crystallinity of a vinyl alcohol-based polymer tends to be deteriorated, so that water-resistance of the crosslinked coating may be deteriorated and furthermore hydrophobization may deteriorate water solubility. A vinyl alcohol-based polymer having an olefin in side chain of the present invention can have one or two or more types of structural units represented by Formula (I). When the polymer has two or more types of the structural units, the total content of the two or more types of structural units is preferably within the above range. A structural unit in a polymer herein refers to a repeating unit making up the polymer. For example, a vinyl alcohol unit or a vinyl ester unit as described below is a structural unit.

In the light of water solubility, a content of a vinyl alcohol unit in a vinyl alcohol-based polymer having an olefin in side chain of the present invention is, but not limited to, preferably 50 mol % or more, more preferably 70 mol % or more, further preferably 75 mol % or more, particularly preferably 80 mol % or more, based on 100 mol % of the total structural units in the polymer. A content of the vinyl alcohol unit is preferably 99.95 mol % or less, more preferably 99.90 mol % or less, based on 100 mol % of the total structural units in the polymer.

The vinyl alcohol unit can be derived from a vinyl ester unit by hydrolysis, alcoholysis or the like. Therefore, the vinyl ester unit may remain in the vinyl alcohol-based polymer, depending on the conditions of conversion of the vinyl ester unit into the vinyl alcohol unit. The vinyl alcohol-based polymer having an olefin in side chain of the present invention may, therefore, contain a vinyl ester unit other than the olefin-containing vinyl ester unit.

Examples of the vinyl ester unit include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among these, vinyl acetate is industrially preferable.

As long as the present invention is effective, the vinyl alcohol-based polymer having an olefin in side chain of the present invention can further contain a structural unit other than the structural unit represented by Formula (I), the vinyl alcohol unit and the vinyl ester unit. The structural unit can be, for example, a structural unit derived from an unsaturated monomer which can be copolymerized with a vinyl ester and be converted into the structural unit represented by Formula (I), a structural unit derived from an ethylenic unsaturated monomer copolymerizable with a vinyl ester, or the like. Examples of an ethylenic unsaturated monomer include α-olefins such as ethylene, propylene, n-butene, isobutylene and 1-hexene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide, N-methylacrylamide, N-ethylacrylamide, N,N-dimethylacrylamide, diacetone acrylamide, acrylamide propanesulfonic acid and salts thereof, acrylamide propyldimethylamine and salts thereof (for example, quaternary salts); methacrylamide, N-methyl methacrylamide, N-ethyl methacrylamide, methacrylamide propanesulfonic acid and salts thereof, methacrylamide propyldimethylamine and salts thereof (for example, quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated dicarboxylic acids such as maleic acid, itaconic acid and fumaric acid, and salts or esters thereof; vinylsilyl compounds such as vinyltrimethoxysilane; and isopropenyl acetate.

There are no particular restrictions to the arrangement sequence of the structural units represented by Formula (I), the vinyl alcohol unit and another optional structural unit in the vinyl alcohol-based polymer having an olefin in side chain of the present invention, and the vinyl alcohol-based polymer having an olefin in side chain of the present invention can be any of a random copolymer, a block copolymer, an alternating copolymer and the like.

A viscosity-average polymerization degree of the vinyl alcohol-based polymer having an olefin in side chain of the present invention as determined in accordance with JIS K6726 is, but not limited to, preferably 100 to 5,000, more preferably 200 to 4,000. If the viscosity-average polymerization degree is less than 100, a film formed may have lower mechanical strength. If the viscosity-average polymerization degree is more than 5,000, the vinyl alcohol-based polymer having an olefin in side chain may not be industrially produced.

There are no particular restrictions to a shape of the vinyl alcohol-based polymer having an olefin in side chain of the present invention; it is preferably powder or a pellet having an average particle size of 20 to 1000 μm. When the average particle size is within the range, handleability and processibility of the vinyl alcohol-based polymer having an olefin in side chain are improved. If the average particle size is less than 20 μm, the powder may be easily dispersed and be difficult to be practically handled. The average particle size is preferably 50 μm or more, more preferably 70 μm or more, further preferably 90 μm or more, particularly preferably 130 μm or more. If the average particle size is more than 1000 μm, it may take too much time to dissolve the vinyl alcohol-based polymer having an olefin in side chain in water. The average particle size is preferably 900 μm or less, more preferably 800 μm or less. Herein, an average particle size denotes a volume-average particle size as measured for vinyl alcohol-based polymer having an olefin in side chain particles dispersed in methanol, by light scattering technique using laser beam.

Preferably, 2 g or more of powder or pellets made of a vinyl alcohol-based polymer having an olefin in side chain of the present invention can be completely dissolved in 100 g of water. Thus, it can be suitably used for a variety of applications. A preferable embodiment of the present invention is powder or pellets made of a vinyl alcohol-based polymer having an olefin in side chain which has an average particle size of 20 to 1000 μm and 2 g or more of which can be completely dissolved in 100 g of water at 25° C. Here, whether the powder or the pellets are completely dissoluble or not, can be determined, based on whether 2 g of the powder or the pellets can be completely dissolved in 100 g of water at 100° C. Specifically, it can be determined as described below. Two grams of powder or pellets are added to 100 g of ion-exchanged water at room temperature (25° C.). The mixture obtained is heated to 100° C. at a rate of 10° C./min with stirring (150 rpm), and stirring is continued at this temperature. Here, whether the powder or the pellets can be completely dissolved in 120 min after temperature rising to 100° C. or not is used as a criterion. It is preferable that the powder or the pellets can be completely dissolved in 60 min after temperature rising to 100° C. Furthermore, when 2 g of the powder or the pellets are completely dissolved in 100 g of water at 100° C. and then the aqueous solution of the vinyl alcohol-based polymer having an olefin in side chain is allowed to be cooled to 25° C., preferably the vinyl alcohol-based polymer having an olefin in side chain in the aqueous solution is kept completely dissolved, and more preferably, the vinyl alcohol-based polymer having an olefin in side chain is kept completely dissolved one day after cooling the aqueous solution of the vinyl alcohol-based polymer having an olefin in side chain to 25° C. However, the pellets made of the polymer having an average particle size of 20 to 1000 μm, 2 g or more of which is not completely dissolved in 100 g of water as pellets, but when being pulverized to particles having an average particle size of 20 to 1000 μm, can be completely dissolved in 100 g of water, is judged to be "completely dissoluble".

There are no particular restrictions to a method for producing a vinyl alcohol-based polymer having an olefin in side chain of the present invention. A convenient production method is transesterification of a vinyl alcohol-based polymer with an ester compound represented by Formula (II).

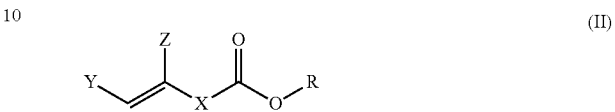

(II)

wherein X, Y and Z are as defined for Formula (I); and R represents a saturated hydrocarbon group with 1 to 5 carbon atoms.

In Formula (II), X, Y and Z are as defined for Formula (I); and R is a saturated hydrocarbon group with 1 to 5 carbon atoms. A preferable embodiment for the method is a method comprising transesterifying the vinyl alcohol unit in the vinyl alcohol-based polymer with the ester compound represented by Formula (II) by admixing the vinyl alcohol-based polymer and the ester compound represented by Formula (II) with a transesterification catalyst. In the reaction, an alcohol represented by ROH (R is as defined for Formula (II)) is eliminated from the ester compound represented by Formula (II), but the alcohol can be removed from the reaction system to promote the reaction of the vinyl alcohol-based polymer with the ester compound represented by Formula (II). From this point of view, the alcohol represented by ROH is preferably a low-boiling compound. Therefore, the number of carbon atoms in R is 1 to 5, preferably 1 to 3, more preferably 1. A preferable saturated hydrocarbon group is at least one selected from the group consisting of alkyl groups and cycloalkyl group. Examples of the alkyl group include a methyl group, an ethyl group, a propyl group, an isopropyl group, a butyl group, an isobutyl group, a sec-butyl group, a tert-butyl group, a pentyl group, an isopentyl group, and a neopentyl group. Among these, at least one alkyl group selected from the group consisting of a methyl group, an ethyl group, a propyl group and an isopropyl group is preferably used, and a methyl group is more preferably used. Examples of the cycloalkyl group include a cyclopropyl group, a cyclobutyl group and a cyclopentyl group. Among these, at least one cycloalkyl group selected from the group consisting of a cyclopropyl group, a cyclobutyl group and a cyclopentyl group is preferably used. X, Y and Z in Formula (II) are preferably those listed in the description of Formula (I).

Preferable examples of the ester compound represented by Formula (II) include, but not limited to, methyl 3-methyl-3-butenoate, methyl 4-pentenoate, methyl 2-methyl-4-pentenoate, methyl 5-hexenoate, methyl 3,3-dimethyl-4-pentenoate, methyl 7-octenoate, methyl trans-3-pentenoate, methyl trans-4-decenoate, ethyl 3-methyl-3-butenoate, ethyl 4-pentenoate, ethyl 2-methyl-4-pentenoate, ethyl 5-hexenoate, ethyl 3,3-dimethyl-4-pentenoate, ethyl 7-octenoate, ethyl trans-3-pentenoate, and ethyl trans-4-decenoate. In the light of ease of the transesterification, at least one selected from the group consisting of methyl 4-pentenoate, methyl 2-methyl-4-pentenoate, methyl 5-hexenoate, methyl 3,3-dimethyl-4-pentenoate, methyl 7-octenoate, methyl trans-3-pentenoate and methyl trans-4-decenoate is preferable, and in the light of water solubility and reactivity with high energy beam, at least one selected from the group consisting of methyl 4-pentenoate, methyl 2-methyl-4-pentenoate, methyl 5-hexenoate and methyl 3,3-dimethyl-4-pentenoate is more preferable, and methyl 3,3-dimethyl-4-pentenoate is most preferable. In the transesterification, two or more of these ester compounds can be used in combination.

Preferable examples of a transesterification catalyst used in the transesterification include, but not limited to, inorganic acids such as hydrochloric acid, sulfuric acid, nitric acid and phophoric acid; organic carboxylic acids such as acetic acid, propionic acid, phthalic acid and benzoic acid; organic sulfonic acids such as methanesulfonic acid, benzenesulfonic acid, p-toluenesulfonic acid and trifluoromethanesulfonic acid; organic phosphoric acids such as diethyl phosphate and phenyl phosphate; alkali metal or alkaline earth metal hydroxides such as sodium hydroxide, potassium hydroxide and magnesium hydroxide; alkali metal or alkaline earth metal carbonates and hydrogen carbonates such as sodium hydrogen carbonate, potassium carbonate and calcium hydrogen carbonate; alkali metal or alkaline earth metal phosphates and hydrogen phosphates such as trilithium phosphate, potassium dihydrogen phosphate, sodium pyrophosphate and calcium metaphosphoate; alkali metal or alkaline earth metal borates such as potassium metaborate, sodium tetraborate and magnesium orthoborate; alkali metal or alkaline earth metal carboxylates such as sodium acetate, potassium acetate, sodium benzoate and magnesium acetate; alkali metal or alkaline earth metal alkoxide or phenoxy compounds such as lithium ethoxide, sodium methoxide, potassium methoxide, magnesium methoxide and sodium phenoxide; alkali metal or alkaline earth metal oxides such as calcium oxide; ammonia; ammonium salts such as ammonium hydroxide, tetramethylammonium hydroxide, tetraethylammonium hydroxide, tetrabutylammonium hydroxide, ammonium carbonate, ammonium hydrogen carbonate, tetramethylammonium methyl carbonate, tetramethylammonium ethyl carbonate, methyltriethylammonium methyl carbonate, methyltri-n-butylammonium methyl carbonate, and methyltri-n-octylammonium methyl carbonate; phosphonium salts such as tetraphenylphosphonium hydroxide, tetramethylphosphonium hydroxide, tetramethylphosphonium methyl carbonate, methyltri-n-butylphosphonium ethyl carbonate and methyltri-n-octylphosphonium methyl carbonate; primary amines such as n-butylamine, benzylamine, aniline and ethylenediamine; secondary amines such as diethylamine, methylethylamine, pyrrolidine, N-methyltoluidine; tertiary amines such as triethylamine, tri-n-butylamine, N-methyl-N-ethylaniline, 1,4-diazabicyclo[2,2,2]octane and 1,8-diazabicyclo[5,4,0]-7-undecene; nitrogen-containing aromatic heterocyclic compounds such as pyridine, picoline, quinoline, imidazole, pyrimidine and N,N-dimethylaminopyridine; cadmium compounds such as cadmium chloride, cadmium oxide and cadmium acetate; tin compounds such as tin chloride, tin oxide, tin acetate, tin octanoate, tributyltin and tin(IV) acetylacetonate dichloride; lead compounds such as lead chloride, lead oxide, lead carbonate and lead tetraacetate; aluminum compounds such as aluminum chloride, aluminum oxide, aluminum acetate and aluminum alkoxides; zinc compounds such as zinc chloride, zinc bromide, zinc iodide, zinc oxide, zinc acetate, zinc trifluoroacetate, zinc stearate, zinc nitrate, zinc carbonate, zinc sulfate, zinc(II) acetylacetonate, zinc(II) trifluoromethanesulfonate, zinc 2-tetrafluoroborate and oxo[hexa(trifluoroacetato)]tetrazinc; bismuth compounds such as bismuth chloride, bismuth oxide and bismuth acetate; iron compounds such as iron chloride, iron oxide, iron acetate, ferric(III) acetylacetonate and N,N'-bis(salicylidene)ethyleneamine iron(II); cobalt compounds such as cobalt chloride, cobalt oxide, cobalt acetate, cobalt stearate and cobalt(II) acetylacetonate; copper compounds such as copper chloride, copper bromide, copper iodide, copper oxide, copper acetate and copper(II) acetylacetonate; chromium compounds such as chromium chloride, chromium oxide, chromium acetate and chromium (III) acetylacetonate; molybdenum compounds such as molybdenum chloride, molybdenum oxide, molybdenum acetate and acetylacetone molybdenum(VI) dioxy salt; manganese compounds such as manganese chloride, manganese oxide, manganese acetate, manganese(II) acetylacetonate; titanium compounds such as titanium chloride, titanium oxide, titanium acetate, alkoxy titanium, titanium lactate, titanium(VI)oxide acetylacetonate; zirconium compounds such as zirconium chloride, zirconium oxide, zirconium acetate and and zirconium(IV) acetylacetonate; hafnium compounds such as hafnium chloride, hafnium oxide and hafnium (IV) trifluoromethanesulfonate; lanthanum compounds such as lanthanum chloride, lanthanum oxide, lanthanum acetate, lanthanum nitrate, lanthanum alkoxides, lanthanum(III) acetylacetonate and lanthanum(III) trifluoromethanesulfonate; germanium compounds such as germanium chloride and germanium oxide; and enzymes such as lipase. Among these, more preferred are inorganic acids, organic carboxylic acids, organic sulfonic acids, organic phosphoric acids, alkali metal or alkaline earth metal hydroxides, alkali metal or alkaline earth metal carbonates and hydrogen carbonates, alkali metal or alkaline earth metal phosphates and hydrogen phosphates, alkali metal or alkaline earth metal carboxylates, alkali metal or alkaline earth metal alkoxides or phenoxides, ammonium salts, phosphonium salts, aluminum compounds, zinc compounds, bismuth compounds, titanium compounds, zirconium compounds and lanthanum compounds, in the light of reactivity and hue of a vinyl alcohol-based polymer having an olefin in side chain obtained. Further preferred are inorganic acids, organic carboxylic acids, organic sulfonic acids, alkali metal or alkaline earth metal hydroxides, alkali metal or alkaline earth metal carbonates and hydrogen carbonates, alkali metal or alkaline earth metal carboxylic acids, alkali metal or alkaline earth metal alkoxides, ammonium salts, zinc compounds, titanium compounds, zirconium compounds and lanthanum compounds. Most preferred are alkali metal hydroxides, alkali metal carbonates, alkali metal carboxylates, alkali metal alkoxides, ammonium salts and zinc compounds.

The amount of a transesterification catalyst is preferably, but not limited to, 0.01 parts by mass to to 30 parts by mass based on 100 parts by mass of a vinyl alcohol-based polymer. If it is less than 0.01 parts by mass, a reaction rate may be significantly reduced, and it is more preferably 0.1 parts by mass or more. If it is more than 30 parts by mass, removal of the residual catalyst may be difficult, leading to deterioration in hue or thermal stability of a vinyl alcohol-based polymer having an olefin in side chain obtained, and it is more preferably 15 parts by mass or less.

The amount of the ester compound represented by Formula (II) is preferably, but not limited to, 0.1 parts by mass to 1000 parts by mass based on 100 parts by mass of the vinyl alcohol-based polymer. If it is less than 0.1 parts by mass, a reaction rate may be significantly reduced, and it is more preferably 5 parts by mass or more. If it is more than 1000 parts by mass, removal of the residual ester compound may be difficult, and thus, it is more preferably 500 parts by mass or less.

Transesterification can be conducted by any method where a vinyl alcohol-based polymer, an ester compound represented by Formula (II) and a transesterification catalyst are mixed; including a method where an ester compound represented by Formula (II) and a transesterification catalyst are added to a molten vinyl alcohol-based polymer before the reaction; a method where the reactants are reacted in a slurry in a solvent in which an ester compound represented by Formula (II) and a transesterification catalyst are dissolved and a vinyl alcohol-based polymer is not dissolved; and a method where the reactants are reacted in a solution in which all of a vinyl alcohol-based polymer, an ester compound represented by Formula (II) and a transesterification catalyst are completely uniformly dissolved. A preferable method can be appropriately employed, taking reactivity and easiness of isolation of a vinyl alcohol-based polymer having an olefin in side chain into account.

When the transesterification is conducted in a slurry or uniform solution, a concentration of the vinyl alcohol-based polymer in the reaction is preferably, but not limited to, 1% by mass to 50% by mass, more preferably 2% by mass to 40% by mass, further preferably 3% by mass to 30% by mass. If it is less than 1% by mass, a reaction velocity may be reduced due to a thin slurry or solution. If it is more than 50% by mass, the reaction may be insufficiently stirred.

Examples of a solvent used in the transesterification include, but not limited to, water; alcohols such as methanol, ethanol, propanol and butanol; aliphatic or alicyclic hydrocarbons such as n-hexane, n-pentane and cyclohexane; aromatic hydrocarbons such as benzene and toluene; aliphatic or aromatic halides such as chloroform, chlorobenzene and dichlorobenzene; nitriles such as acetonitrile and benzonitrile; ethers such as diethyl ether, diphenyl ether, anisole, 1,2-dimethoxyethane and 1,4-dioxane; ketones such as acetone, methyl isopropyl ketone and methyl isobutyl ketone; esters such as ethyl acetate and ethyl propionate; N-alkyllactams such as N-methyl-2-pyrrolidone; N,N-dialkylamides such as N,N-dimethylformamide and N,N-dimethylacetamide; sulfoxides such as dimethyl sulfoxide; and sulfolanes such as sulfolane. Particularly, aprotic polar solvents are preferable, including nitriles, ethers, ketones, esters, N-alkyllactams, N,N-dialkylam ides, sulfoxides and sulfolanes. N-alkyllactams, N,N-dialkylam ides and sulfoxides are more preferable.

Although there are no particular restrictions to a temperature of the transesterification, the reaction is preferably conducted at a boiling point of an alcohol eliminated from the ester compound represented by Formula (II) or higher, in order to remove the alcohol from the reaction system. From this point of view, the temperature is preferably 20 to 200° C., more preferably 30 to 180° C., further preferably 40 to 170° C., most preferably 50 to 150° C. For lowering a boiling point of the alcohol eliminated from the ester compound, the reaction system can be vacuumed preferably to 5 kPa to 99 kPa, more preferably to 8 kPa to 97 kPa, further preferably 10 kPa to 95 kPa.

Utilizing its properties, a vinyl alcohol-based polymer having an olefin in side chain of the present invention alone or as a composition containing other components can be used for various applications of a vinyl alcohol-based polymer, in accordance with a known method such as molding, spinning and emulsification. It can be, for example, used for a surfactant for various applications; a paper coating agent; a paper modifier such as an internal additive for paper and a pigment binder; an adhesive for a wood, a paper, an aluminum foil and an inorganic material; a binder for nonwoven fabric; a paint; a warp sizing agent; a fiber finishing agent; a sizing agent for hydrophobic fiber such as polyester; various other films; a sheet; a bottle; a fiber; a thicker; an aggregating agent; a soil modifier; and hydrogel.

As long as the effects of the present invention are not inhibited, an additive can be optionally, if necessary, added to a vinyl alcohol-based polymer having an olefin in side chain of the present invention, including a filler, a processing stabilizer such as a copper compound, a weather-resistance stabilizer, a colorant, an ultraviolet absorber, a light stabilizer, an antioxidant, an antistatic agent, a flame retardant, a plasticizer, another thermoplastic resin, a lubricant, a flavor, a defoaming agent, a deodorant, an extender, a release agent, a mold release, a reinforcing agent, an antifungal agent, an antiseptic and a crystallization retarding agent, depending on its application.

EXAMPLES

There will be detailed the present invention with reference to Examples, but the present invention is not limited to these examples at all. Unless otherwise indicated, "%" and "part(s)" in Examples and Comparative Examples denote "% by mass" and "part(s) by mass", respectively.

[Calculation of a Modification Rate]

Using a nuclear magnetic resonance spectrometer "LAMBDA 500" from JEOL Ltd., $^1$H-NMR analysis of a vinyl alcohol-based polymer having an olefin in side chain was conducted at room temperature, and a modification rate (a content of the repeating unit represented by Formula (I) based on the total monomer units in the vinyl alcohol-based polymer having an olefin in side chain) was calculated.

[Calculation of an Average Particle Size]

Using a laser diffraction instrument "LA-950V2" from Horiba, Ltd., a volume-average particle size was determined for a dispersion of a vinyl alcohol-based polymer of any of Examples and Comparative Examples in methanol.

[Evaluation of Water Solubility]

A vinyl alcohol-based polymer obtained in any of Examples and Comparative Examples was heated in a hot-air oven at 150° C. for 6 hours. Then, 2 g of the vinyl alcohol-based polymer was added to 100 g of ion-exchanged water at room temperature (25° C.), and the obtained mixture was heated to 100° C. at a rate of 10° C./min with stirring (150 rpm). Stirring was continued at 100° C. until the vinyl alcohol-based polymer was completely dissolved. After the vinyl alcohol-based polymer was completely dissolved, heating was stopped and the mixture was allowed to be cooled to room temperature (25° C.). Powder made of the final vinyl alcohol-based polymer was evaluated according to the following criteria.

A: the powder was completely dissolved in 60 min after it was heated to 100° C., and one day after cooling, the dissolved state was maintained.

B: the powder was completely dissolved in 120 min after it was heated to 100° C., and one day after cooling, the dissolved state was maintained.

C: the powder was not completely dissolved in 120 min after it was heated to 100° C.

[Evaluation of Water Resistance of a Film]

2-Hydroxy-4'-(2-hydroxyethoxy)-2-methylpropiophenone as a photo initiator was added to and dissolved in an aqueous solution of a vinyl alcohol-based polymer obtained in any of Examples and Comparative Examples (concentration: 5% by mass) to an equimolar amount to a functional group in the olefin introduced, to prepare a coating solution. The coating solution was cast on a 15 cm×15 cm mold formed by folding the corners of a polyethylene terephthalate film, followed by fully evaporating the solvent at room temperature under atmospheric pressure, to provide a film with a thickness of about 100 µm. The film was irradiated with UV at an intensity of 120 J/cm², to prepare a film for evaluation. The film for evaluation was immersed in a boiling water for one hour, removed from the water bath, and dried in vacuo at 40° C. for 12 hours, followed by measuring its mass (W1). From the mass (W1) and a mass before immersion (W2), an elution rate under boiling conditions was calculated in accordance with the equation below. The elution rate was used as a measure for water resistance after crosslinking. When a film for evaluation was dissolved in water during immersion, it was evaluated as "unmeasurable" ("-" in Table 1).

Elution rate( % by mass)=100×([$W2$]−[$W1$])/[$W2$]

Example 1

In a reaction vessel equipped with a stirrer, a reflux condenser, a nitrogen inlet tube and an inlet for a reaction substrate were charged 100 parts by mass of a commercially available polyvinyl alcohol (Elvanol® 71-30 from Kuraray America, Inc., a saponification degree: 99.5 mol %, a viscosity-average polymerization degree: 1700) and 400 parts by mass of dimethyl sulfoxide, to prepare a 20% by mass solution. To the solution were added 65 parts by mass of methyl 3,3-dimethylpentenoate and 0.4 parts by mass of tetramethylammonium methyl carbonate as a catalyst, and the mixture was heated under nitrogen stream to 100° C., and then heated with stirring for 130 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (106 µm to 300 µm) to give sieved particles. Table 1 shows analysis results of a modification rate and an average particle size, and physical property evaluation for the vinyl alcohol-based polymer having an olefin in side chain.

Example 2

In a reaction vessel equipped with a stirrer, a reflux condenser, a nitrogen inlet tube and an inlet for a reaction substrate were charged 100 parts by mass of a commercially available polyvinyl alcohol (Elvanol® 71-30 from Kuraray America, Inc., a saponification degree: 99.5 mol %, a viscosity-average polymerization degree: 1700) and 400 parts by mass of dimethyl sulfoxide, to prepare a 20% by mass solution. To the solution were added 64.4 parts by mass of methyl 3,3-dimethylpentenoate and 0.4 parts by mass of tetramethylammonium methyl carbonate as a catalyst, and the mixture was heated under nitrogen stream to 100° C., and then heated with stirring for 300 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (106 µm to 300 µm) to give sieved particles. Table 1 shows analysis results of a modification rate and an average particle size, and physical property evaluation for the vinyl alcohol-based polymer having an olefin in side chain.

Example 3

In a reaction vessel equipped with a stirrer, a reflux condenser, a nitrogen inlet tube and an inlet for a reaction substrate were charged 100 parts by mass of a commercially available polyvinyl alcohol (PVA-124 from Kuraray Co., Ltd., a saponification degree: 99.9 mol %, a viscosity-average polymerization degree: 2400) and 833.3 parts by mass of dimethyl sulfoxide, to prepare a 10.7% by mass solution. To the solution were added 40.8 parts by mass of methyl 3,3-dimethylpentenoate and 0.4 parts by mass of tetramethylammonium methyl carbonate as a catalyst, and the mixture was heated under nitrogen stream to 100° C., and then heated with stirring for 420 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (125 µm to 355 µm) to give sieved particles. Table 1 shows analysis results of a modification rate and an average particle size, and physical property evaluation for the vinyl alcohol-based polymer having an olefin in side chain.

Example 4

In a reaction vessel equipped with a stirrer, a reflux condenser, a nitrogen inlet tube and an inlet for a reaction substrate were charged 100 parts by mass of a commercially available polyvinyl alcohol (Elvanol® 71-30 from Kuraray America, Inc., a saponification degree: 99.5 mol %, a viscosity-average polymerization degree: 1700) and 240 parts by mass of dimethyl sulfoxide, to prepare a 29.4% by mass solution. To the solution were added 54 parts by mass of methyl 5-hexenoate and 0.4 parts by mass of tetramethylammonium methyl carbonate as a catalyst, and the mixture was heated under nitrogen stream to 100° C., and then heated with stirring for 300 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (125 µm to 355 µm) to give sieved particles. Table 1 shows analysis results of a modification rate and an average particle size, and physical property evaluation for the vinyl alcohol-based polymer having an olefin in side chain.

Example 5

In a reaction vessel equipped with a stirrer, a reflux condenser, a nitrogen inlet tube and an inlet for a reaction substrate were charged 100 parts by mass of a commercially available polyvinyl alcohol (PVA-105 from Kuraray Co., Ltd., a saponification degree: 98.5 mol %, a viscosity-average polymerization degree: 500) and 400 parts by mass of dimethyl sulfoxide, to prepare a 20% by mass solution. To the solution were added 240 parts by mass of methyl 3,3-dimethylpentenoate and 3.4 parts by mass of tetramethylammonium methyl carbonate as a catalyst, and the mixture was heated under nitrogen stream to 100° C., and then heated with stirring for 500 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (125 µm to 500 µm) to give sieved particles. Table 1 shows analysis results of a modification rate and an average particle size, and physical property evaluation for the vinyl alcohol-based polymer having an olefin in side chain.

Example 6

In a reaction vessel equipped with a stirrer, a reflux condenser, a nitrogen inlet tube and an inlet for a reaction substrate were charged 100 parts by mass of a commercially available polyvinyl alcohol (PVA-105 from Kuraray Co., Ltd., a saponification degree: 98.5 mol %, a viscosity-average polymerization degree: 1700) and 400 parts by mass of dimethyl sulfoxide, to prepare a 20% by mass solution. To the solution were added 51.7 parts by mass of methyl trans-3-pentenoate and 0.4 parts by mass of tetramethylammonium methyl carbonate as a catalyst, and the mixture was heated under nitrogen stream to 100° C., and then heated with stirring for 70 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (1000 μm to 1400 μm) to give sieved particles. Table 1 shows analysis results of a modification rate and an average particle size, and physical property evaluation for the vinyl alcohol-based polymer having an olefin in side chain.

Example 7

In a reaction vessel equipped with a stirrer, a reflux condenser, a nitrogen inlet tube and an inlet for a reaction substrate were charged 100 parts by mass of a commercially available polyvinyl alcohol (PVA-105 from Kuraray Co., Ltd., a saponification degree: 98.5 mol %, a viscosity-average polymerization degree: 500) and 900 parts by mass of dimethyl sulfoxide, to prepare a 10% by mass solution. To the solution were added 70 parts by mass of methyl 7-octenoate and 2.0 parts by mass of tetramethylammonium methyl carbonate as a catalyst, and the mixture was heated under nitrogen stream to 100° C., and then heated with stirring for 100 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (90 μm to 150 μm) to give sieved particles. Table 1 shows analysis results of a modification rate and an average particle size, and physical property evaluation for the vinyl alcohol-based polymer having an olefin in side chain.

Example 8

In a reaction vessel equipped with a stirrer, a reflux condenser, a nitrogen inlet tube and an inlet for a reaction substrate were charged 100 parts by mass of a commercially available polyvinyl alcohol (Elvanol® 71-30 from Kuraray America, Inc., a saponification degree: 99.5 mol %, a viscosity-average polymerization degree: 1700) and 240 parts by mass of dimethyl sulfoxide, to prepare a 29.4% by mass solution. To the solution were added 40 parts by mass of methyl 3,3-dimethylpentenoate and 3.7 parts by mass of tetramethylammonium methyl carbonate as a catalyst, and the mixture was heated under nitrogen stream to 100° C., and then heated with stirring for 300 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (1180 μm to 1700 μm) to give sieved particles. Table 1 shows analysis results of a modification rate and an average particle size, and physical property evaluation for the vinyl alcohol-based polymer having an olefin in side chain.

Comparative Example 1

In a vessel were added 100 parts by mass of a commercially available polyvinyl alcohol (Kuraray America, Inc., Elvanol® 71-30, a saponification degree: 99.5 mol %, a viscosity-average polymerization degree: 1700) and 400 parts by mass of dimethyl sulfoxide, to prepare a 20% by mass solution. The solution was added dropwise to methanol, to isolate a polymer, which was then dried in vacuo at 40° C. overnight. The polyvinyl alcohol was pulverized and then passed through a sieve (600 μm to 1000 μm) to give sieved particles. Table 1 shows analysis results of an average particle size and physical property evaluation for the polyvinyl alcohol.

Comparative Example 2

In a reaction vessel equipped with a stirrer, a reflux condenser, a nitrogen inlet tube and an inlet for a reaction substrate were charged 100 parts by mass of a commercially available polyvinyl alcohol (Elvanol® 71-30 from Kuraray America, Inc., a saponification degree: 99.5 mol %, a viscosity-average polymerization degree: 1700) and 400 parts by mass of dimethyl sulfoxide, to prepare a 20% by mass solution. To the solution were added 45.6 parts by mass of methyl methacrylate and 0.4 parts by mass of tetramethylammonium methyl carbonate as a catalyst, and the mixture was heated under nitrogen stream to 100° C., and then heated with stirring for 300 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (90 μm to 150 μm) to give sieved particles. Table 1 shows analysis results of a modification rate and an average particle size, and physical property evaluation for the vinyl alcohol-based polymer having an olefin in side chain.

Comparative Example 3

In a reaction vessel equipped with a stirrer, a reflux condenser, a nitrogen inlet tube and an inlet for a reaction substrate were charged 100 parts by mass of a commercially available polyvinyl alcohol (Elvanol® 71-30 from Kuraray America, Inc., a saponification degree: 99.5 mol %, a viscosity-average polymerization degree: 1700) and 900 parts by mass of dimethyl sulfoxide, to prepare a 10% by mass solution. To the solution were added 40 parts by mass of methyl 10-undecenoate and 0.4 parts by mass of tetramethylammonium methyl carbonate as a catalyst, and the mixture was heated under nitrogen stream to 100° C., and then heated with stirring for 30 min. Then, the solution was added dropwise to methanol, to isolate a polymer, which was then dried in vacuo at 40° C. overnight, to give a target vinyl alcohol-based polymer having an olefin in side chain. The vinyl alcohol-based polymer having an olefin in side chain thus obtained was pulverized and then passed through a sieve (300 μm to 710 μm) to give sieved particles. Table 1 shows analysis results of a modification rate and an average particle size, and physical property evaluation for the vinyl alcohol-based polymer having an olefin in side chain.

TABLE 1

| | Vinyl alcohol-based polymer | | | | Results of physical property evaluation | |
|---|---|---|---|---|---|---|
| | Polymerization degree of base polymer | Reaction substrate | Modification rate [mol %] | Average particle size [μm] | Water solubility | Water resistance (elution rate) [%] |
| Example 1 | 1700 | Methyl 3,3-dimethyl-4-pentenoate | 1.2 | 183 | A | 18.1 |
| Example 2 | 1700 | Methyl 3,3-dimethyl-4-pentenoate | 2.6 | 169 | A | 9.8 |
| Example 3 | 2400 | Methyl 3,3-dimethyl-4-pentenoate | 1.9 | 212 | A | 13.5 |
| Example 4 | 1700 | Methyl 5-hexenoate | 2.9 | 201 | A | 19.8 |
| Example 5 | 500 | Methyl 3,3-dimethyl-4-pentenoate | 12.5 | 399 | B | 4.5 |
| Example 6 | 1700 | Methyl trans-3-pentenoate | 0.8 | 1281 | A | 31.4 |
| Example 7 | 500 | Methyl 7-octenoate | 0.3 | 122 | B | 27.8 |
| Example 8 | 1700 | Methyl 3,3-dimethyl-4-pentenoate | 3.9 | 1550 | B | 8.8 |
| Comparative Example 1 | 1700 | — | — | 776 | A | 100.0 |
| Comparative Example 2 | 1700 | Methyl methacrylate | 5.8 | 105 | C | — |
| Comparative Example 3 | 1700 | Methyl 10-undecenoate | 0.5 | 545 | C | — |

As shown in Examples 1 to 8, it can be found that a vinyl alcohol-based polymer having an olefin in side chain of the present invention keeps higher water solubility after heating and can be made water-resistant by UV-ray crosslinking. Therefore, the vinyl alcohol-based polymer having an olefin in side chain of the present invention can be used for a wide range of applications of a polyvinyl alcohol.

An unmodified polyvinyl alcohol as in Comparative Example 1 cannot be made water-resistant by UV-ray. When an α,β-unsaturated olefin is introduced as in Comparative Example 2, it is crosslinked by heating, leading to significantly lower water solubility. When a reaction substrate having a longer carbon chain is introduced as in Comparative Example 3, water solubility is significantly lowered.

The invention claimed is:

1. A vinyl alcohol-based polymer comprising an olefin in a side chain, the vinyl alcohol-based polymer comprising:
   a vinyl alcohol unit and
   a structural unit represented by the following formula (I):

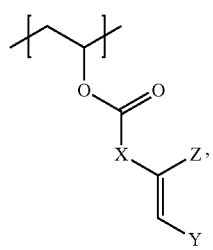

(I)

wherein X represents at least one alkylene group selected from the group consisting of a methylene group, an ethylene group, a propylene group and a butylene group, having an alkyl group as a branched structure; Y represents a hydrogen atom; and Z represents a hydrogen atom.

2. The vinyl alcohol-based polymer of claim 1, wherein the total carbon number of X is 9 or less.

3. The vinyl alcohol-based polymer of claim 1, wherein a content of the structural unit represented by the formula (I) based on the total monomer units in the vinyl alcohol-based polymer is from 0.05 to 10 mol %.

4. A powder or pellets made of the vinyl alcohol-based polymer of claim 1, wherein the vinyl alcohol-based polymer has a volume average particle size of from 20 to 1000 μm and 2 g or more of the vinyl alcohol-based polymer can be completely dissolved in 100 g of water at 25° C.

5. A method for producing the vinyl alcohol-based polymer of claim 1, the method comprising:
   transesterifying a vinyl alcohol-based polymer with an ester compound of the following formula (II):

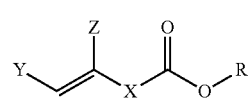

(II)

wherein X represents at least one alkylene group selected from the group consisting of a methylene group, an ethylene group, a propylene group and a butylene group, having an alkyl group as a branched structure; Y represents a hydrogen atom; and Z represents a hydrogen atom, and R represents a saturated hydrocarbon group having from 1 to 5 carbon atoms.

6. The vinyl alcohol-based polymer of claim 1, comprising a structural unit represented by the following formula:

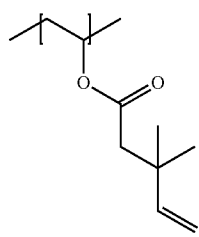

* * * * *